US009135305B2

(12) United States Patent
Taubman et al.

(10) Patent No.: US 9,135,305 B2
(45) Date of Patent: Sep. 15, 2015

(54) RANKING OBJECT SEARCH RESULTS

(75) Inventors: Gabriel Taubman, Brooklyn, NY (US); David Petrou, Brooklyn, NY (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/069,978

(22) Filed: Mar. 23, 2011

(65) Prior Publication Data
US 2015/0169572 A1 Jun. 18, 2015

Related U.S. Application Data

(60) Provisional application No. 61/316,935, filed on Mar. 24, 2010.

(51) Int. Cl.
G06F 17/30 (2006.01)
(52) U.S. Cl.
CPC ...... *G06F 17/3053* (2013.01); *G06F 17/30247* (2013.01)
(58) Field of Classification Search
CPC .......................... G06F 17/305; G06F 17/30247
USPC .............................. 707/706, E17.019, 999.003
See application file for complete search history.

(56) References Cited

U.S. PATENT DOCUMENTS

| 4,969,202 | A | | 11/1990 | Groezinger |
|---|---|---|---|---|
| 5,892,843 | A | * | 4/1999 | Zhou et al. ..................... 382/176 |
| 6,253,201 | B1 | * | 6/2001 | Abdel-Mottaleb et al. ........... 1/1 |
| 7,099,510 | B2 | | 8/2006 | Jones et al. |
| 7,515,739 | B2 | | 4/2009 | Porter et al. |
| 2003/0235327 | A1 | * | 12/2003 | Srinivasa ...................... 382/104 |
| 2006/0227992 | A1 | * | 10/2006 | Rathus et al. ................. 382/100 |
| 2007/0047782 | A1 | * | 3/2007 | Hull et al. ..................... 382/124 |
| 2008/0253656 | A1 | * | 10/2008 | Schwartzberg et al. ...... 382/181 |
| 2009/0208118 | A1 | * | 8/2009 | Csurka .......................... 382/228 |
| 2010/0040285 | A1 | * | 2/2010 | Csurka et al. ................. 382/170 |

* cited by examiner

*Primary Examiner* — Shiow-Jy Fan
(74) *Attorney, Agent, or Firm* — Fish & Richardson P.C.

(57) ABSTRACT

Methods, systems, and apparatus, including computer programs encoded on a computer storage medium, for ranking object search results. In one aspect, a method includes providing an image to an image processing apparatus, the image defined within a first bounded region. Object search results are received from the image processing apparatus. Each object search result identifies an object belonging to one of a plurality of pre-specified object classes, and defining a respective second bounded region in which the identified object is located, the respective second bounded region being within the first bounded region. For each object search result, a respective rank score from characteristics of the respective second bounded region defined by the object search result is determined. The object search results are ranked according to their respective rank scores.

27 Claims, 9 Drawing Sheets

RANKING OBJECT SEARCH RESULTS

CROSS-REFERENCE TO RELATED APPLICATIONS

This application claims the benefit of U.S. Provisional Application No. 61/316,935, filed Mar. 24, 2010. The above-referenced application is incorporated herein by reference.

BACKGROUND

This specification relates to digital information processing, and particularly to processing image data.

Digital images can illustrate landscapes, people, scenes, and other subjects. For example, an image may contain an image of a person standing by a landmark. Current technology allows a system to recognize pre-defined objects, for example, images of faces, flesh, animals, etc., as well as the position of the objects within the scene. Thus, for an image that contains multiple objects, e.g., the image of a person standing in front of a famous landmark, the system can identify the multiple objects. These systems, however, do not identify which object within the image is the most important.

SUMMARY

In general, one innovative aspect of the subject matter described in this specification can be embodied in methods that include the actions of providing an image to an image processing apparatus, the image defined in a first bounded region; receiving from the image processing apparatus a plurality of object search results, each object search result: identifying an object belonging to one of a plurality of pre-specified object classes; and defining a respective second bounded region in which the identified object is located, the respective second bounded region being within the first bounded region; determining, for each object search result, a respective rank score from characteristics of the respective second bounded region defined by the object search result; and ranking the object search results according to their respective rank scores. Other embodiments of this aspect include corresponding systems, apparatus, and computer programs, configured to perform the actions of the methods, encoded on computer storage devices.

These and other embodiments can each optionally include one or more of the following features. Determining, for each object search result, the respective rank score from the respective second bounded region defined by the object search result may include determining a respective area bounded by the respective second bounded region; and determining the respective rank score based on the respective area. Determining, for each object search result, the respective rank score from the respective second bounded region defined by the object search result may include determining a first centroid of the first bounded region; determining a respective second centroid of the respective second bounded region; determining a distance between the first centroid and the respective second centroid; and determining the respective rank score based on the respective distance. Determining the respective rank score based on the respective distance may include calculating the respective rank score in substantially inverse proportion to the distance. Each object search result may include a respective accuracy score that that measures an accuracy of the object belonging to one of the plurality of pre-specified object classes; and calculating the respective rank score in substantially inverse proportion to the distance may include dividing the accuracy score of the object search result by a function of the respective distance. Determining, for each object search result, the respective rank score from the respective second bounded region defined by the object search result may include identifying, for the respective second bounding region, another respective second bounding region that overlaps the respective second bounding region; and determining the respective rank score based on the overlap. Determining the respective rank score based on the overlap may include determining a ratio of a first portion of the second bounding region that is not overlapped by the another respective second bounding region to second portion of the second bounding region that is overlapped by the another respective second bounding region; and determining the respective rank score based on the ratio. Determining, for each object search result, the respective rank score from the respective second bounded region defined by the object search result may include determining a respective area bounded by the respective second bounded region; determining an area score based on the respective area; determining a first centroid of the first bounded region; determining a respective second centroid of the respective second bounded region; determining a distance between the first centroid and the respective second centroid; determining a centroid score based on the respective distance; identifying, for the respective second bounding region, another respective second bounding region that overlaps the respective second bounding region; determining an overlap score based on the overlap; and determining the respective rank score based on the area score, the centroid score, and the overlap score. Each respective second bounded region may define a rectangular region having a height and a width. Each object search result further may include a portion of the image bounded by the respective second bounded region. Each object search result may include a respective accuracy score that that measures an accuracy of the object belonging to one of the plurality of pre-specified object classes; and determining, for each object search result, the respective rank score from the respective second bounded region defined by the object search result comprises determining the respective rank score based on the accuracy score of the object search result and the respective second bounded region defined by the object search result. Each respective second bounded region may be a proper subset of the first bounded region.

Particular embodiments of the subject matter described in this specification can be implemented so as to realize one or more of the following advantages. Object search results may be ranked based upon bounded regions. The relevance of search results may be increased.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
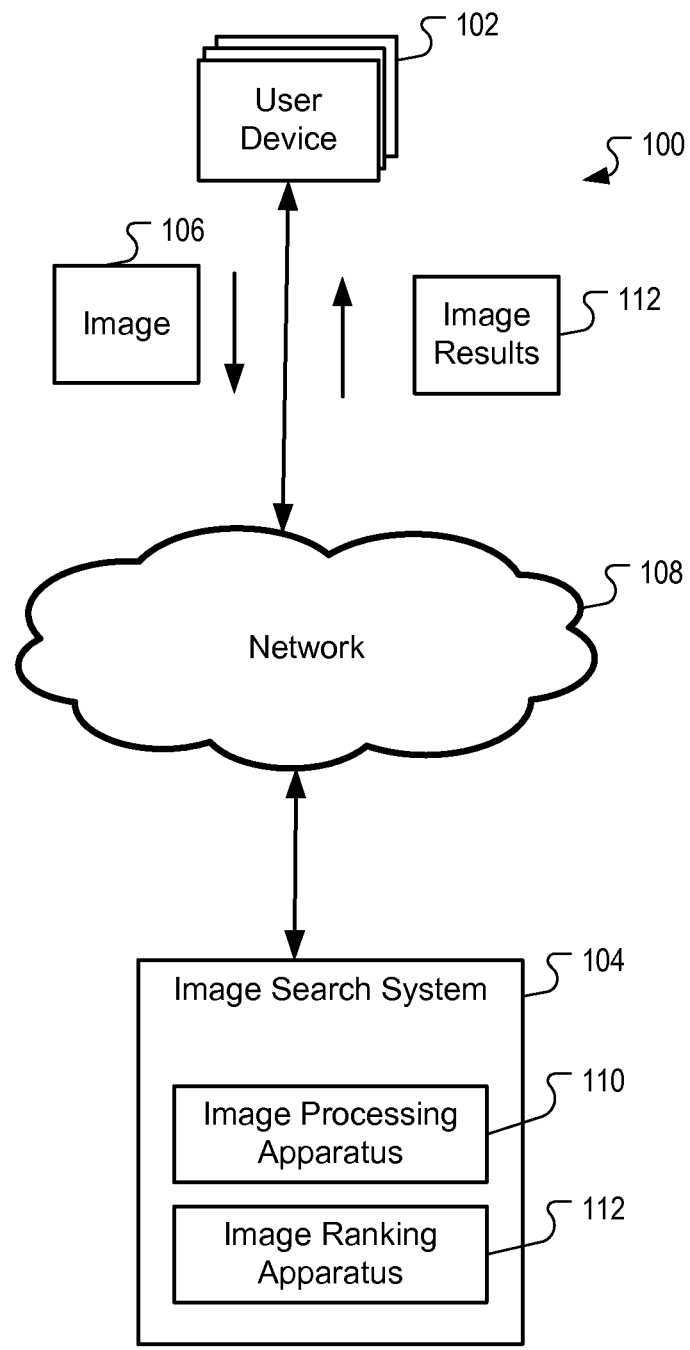
FIG. 1 is a block diagram of an example of an environment in which an image search system provides services.

FIG. 1 is a block diagram of an example environment in which an image search system 104 provides services. A computer network 108, such as a local area network (LAN), wide area network (WAN), the Internet, or a combination thereof, connects user devices 102 and the image search service.

A user device can be an electronic device that is under control of a user and can be capable of sending requests including images and receiving responses over the network. A user device typically includes a user application, such as a web browser or other application, to facilitate the sending and receiving of data over the network.

In this example environment, a user device submits an images search request for an image 106 to the image search system. The search request can, in some implementations, include the image 106. Alternatively, the search request can specify the location of the image 106. In response to the image search request, the image search system 104 sends the image 106 to an image processing apparatus 110. The image processing apparatus 110 processes the image 106 and generates objects search results that define bounded regions within the image. In general, the identified bounded regions include sub-images which may be representative of objects within the image. The bounded regions may include the entire image, or can include only a proper subset of the image.

The image search system sends the object search results to an image ranking apparatus 112. The image ranking apparatus ranks the object search results based on the characteristics of the bounded regions. The ranking process is described in more detail below. The ranked bounded regions can be used, for example, to determine a likely subject of the image.

In some implementations, the ranked object search results are sent to the user in the form of images 112 taken from the respective bounded regions. In other implementations, the ranked object search results may be used in other fashions. For example, the ranked results may be sent to a search engine configured to accept the top ranked, or the top N ranked search results as input to a search operation that searches for other images and/or information related to the object classes to which the identified objects belong.

Figure 2:
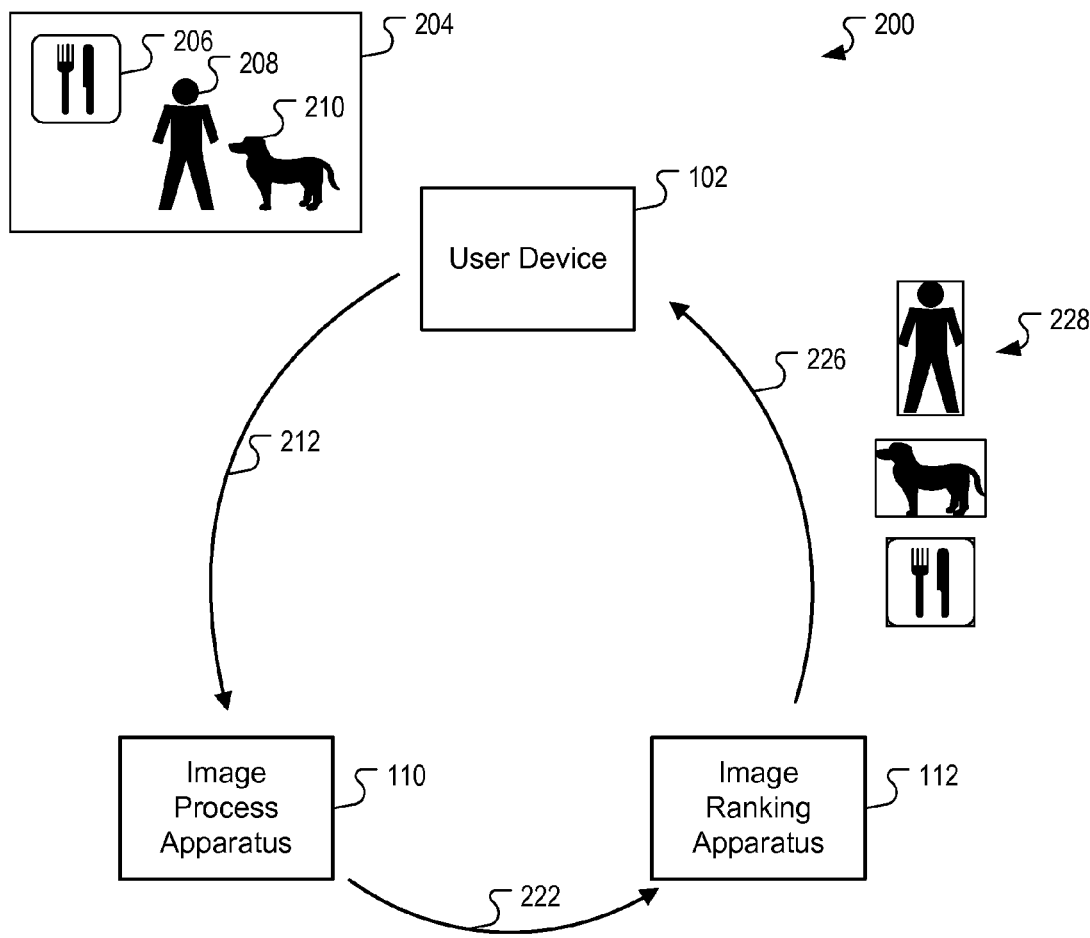
FIG. 2 is a block diagram illustrating an example of a process performed by an image search system.

FIG. 2 is a block diagram illustrating an example of a process performed by an image search system 104. The process functions in the environment 100 shown in FIG. 1. A user operating a user device 102 obtains an image 204. For example, the user device may contain a camera that is used to take the image, or the image may be obtained by a web browser running on the user device accessing a resource located on a network, or the image may be otherwise stored or be accessible by the user device. In this example, the image contains three potential objects, a sign for a restaurant 206, a person 208, and a dog 210.

Represented by process arrow 212, the image is sent to an image processing apparatus 110. The image processing apparatus may be, for example, a component of the image search system 104 shown in FIG. 1. The image process apparatus provides object search results. The image defines a first bounded region. For example, if the bounded region is measured in pixels, and the image 204 is 500×500 pixels, then the first bounded region is 500×500 pixels. A subset of the image could also be used, e.g., a fixed number of pixels (such as five pixels) near each edge can be ignored, resulting in a first bounded region of 490×490 pixels.

In some implementations, each object search result identifies an object belonging to one or more pre-specified object classes, and defines a respective second bounded region in which the identified object is located in the image. The respective second bounded region is within the first bounded region of the image. As used herein, an object class is a classification of objects that image search system 104 is trained to identify in an image. For example, an object class of faces classifies faces (or features of a face) that the image search system 104 is trained to identify. Examples of object classes include buildings, landmarks, skin, animals and animal species, and text and logos, to name just a few.

Each image search result identifies bounded regions within the image. Each bounded region specifies a region in which an identified object is located. In this example, the image processing apparatus provides three object search results that respectively define three bounded regions—a region around the sign 216, a region around the person 218, and the region around the dog 220.

The bounded region may be a bounding box that encapsulates the object. In some implementations, a bounding box is a box that completely encloses the object and that defines an area that is less than the first bounded region. In some implementations, the bounding boxes may be aligned to the axis of the image. That is the sides, top, and bottom of each bounding box is parallel to the sides, top, and bottom of the image. In other implementations, the bounding box may be arbitrarily oriented in the image in order to minimize the dimensions of the box. In other implementations, other shapes may be used. For example, the bounded region may be a minimum circle that completely encapsulates the object.

In some implementations, the image processing apparatus 104 also provides a measure for quality for each object search result. For example, a quality measure can correspond to the likelihood or confidence that the identified object is accurately identified by the pre-defined object class. For example, an image that includes a front view of a face in sharp focus may result in a very high quality score (e.g., a high confidence score that the detected object is actually a face), while an image that includes a side view of a face that is blurred and partially obscured may result is a low quality score (e.g., a low confidence score that the detected object is actually a face).

The position of the identified objects in the image and the size of the identified objects can be interpreted as signals that are indicative of the subject matter of the image. For example, if there is only one object identified in the image, and the object is in the center of the image, then it is likely that the object is the intended subject of the image. Conversely, if there are several objects in the image—e.g., the sign 206, the person 208 and the dog 210—then any of the objects may be the intended subject of the image, or perhaps all are intended subjects. The location and size of the identified objects can be used to rank the identified objects.

Represented by process arrow 222, information provided by the image processing apparatus 110 is sent to an image ranking apparatus 112. The image ranking apparatus 112 is an example of the image ranking apparatus 112 shown in FIG. 1. In this example the image ranking apparatus produces a ranking score for each of the objects identified by the bounded regions based on the measure of quality, the original image, and the bounded regions. The image processing apparatus then ranks the objects based on the ranking scores.

Represented by process arrow 226, object search results 228 in the form of images of the ranked objects are sent back to the user device in a ranked order. Once received at the user device, the user device may take one or more actions, depending on the end user application. In one implementation, the user device may present the identified objects to the user to select one or more identified objects for additional processing, for example, cropping or sending the image as a search result. In other implementations, the image processing apparatus may automatically send one or more of the identified objects to an image search engine to search for other images or information related to the objects. For example, one or more of the highest ranked objects may be sent to an image search engine. In some implementations, all of the ranked objects may be sent to an image search engine in ranked order.

Figure 3:
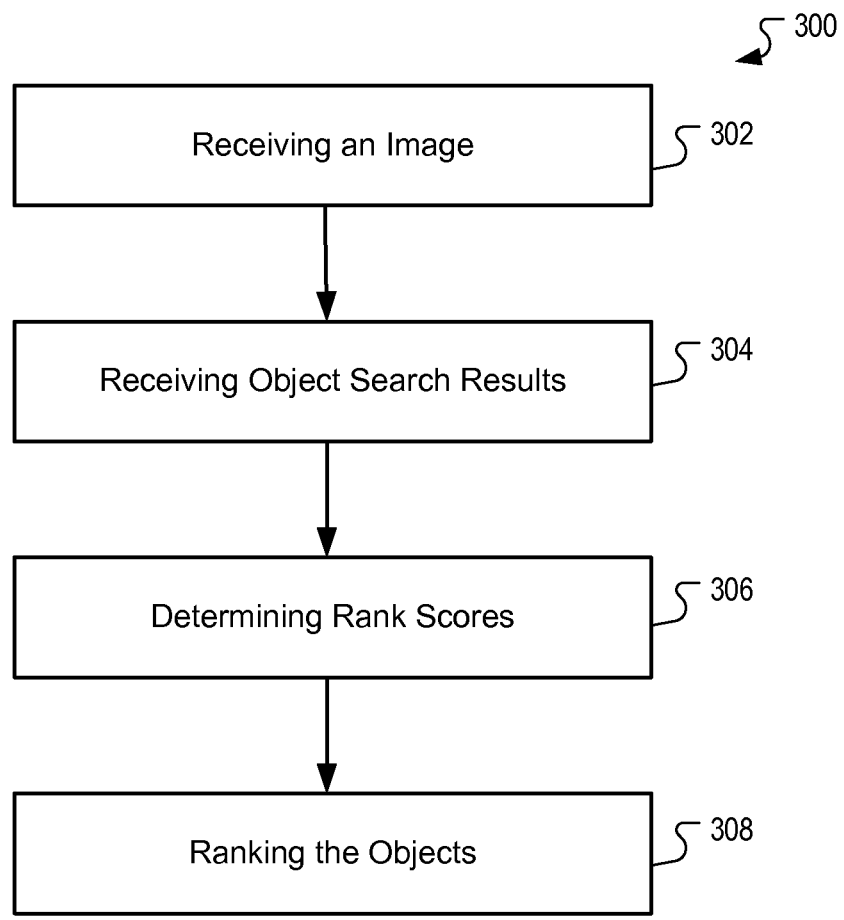
FIG. 3 is a flow diagram of an example of a process for ranking object search results of an image.

FIG. 3 is a flow diagram of an example of a process 300 for ranking the object search results of an image. The process 300 may be implemented in an image search system 104.

The process receives an image (302). For example, the image search system may receive the image (302). The image contains one or more potential objects (e.g., objects that may be identified).

The process 300 receives object search results (304). For example, the image ranking apparatus 112 may receive the object search results from the image processing apparatus 110. Each object search result defines a bounded region. In some implementations, the bounded regions may be identified relative to the image, e.g., in the form of x and y components relative to an axis defined by the image 204. Object search results may also include a measure of quality of the identified object.

The process 300 determines rank scores (306). For example, the image ranking apparatus 112 may determine rank scores. Rank scores for each object search result are determined using information about characteristics of the bounded region, and, optionally, any quality scores associated with the image search results. The rank scores may be determined using characteristics including the area of the bounded region, the location of the bounded region relative to the image, or the degree to which a bounded region overlaps another bounded region. In other implementations, one or more different rankings based on the characteristics of the bounded region may be used. For example, in some implementations, a rank score may be determined using the area of the bounded region and the degree to which a bounded region overlaps another bounded region. In other implementations, the rank score is determined using the area of the bounded region, the location of the bounded region relative to the image, and the degree to which a bounded region overlaps another bounded region. Other combinations of two or more scores based on the area of the bounded region, the location of the bounded region relative to the image, and the degree to which a bounded region overlaps another bounded region can also be used.

In some implementations, each criterion produces an intermediate factor which may be multiplied with the factors of other criterion so that each criterion may be applied sequentially. In some implementations the factors are further multiplied by the provided measure of quality of the identified object.

The process includes ranking the objects (308). For example, the image ranking apparatus 112 may rank the objects (and thereby ranks the object search results) based on the determined rank scores.

FIGS. 4A, 4B, 5A, 5B, 6A and 6B illustrate examples of ranking processes that can be used to rank object search results for an image. Each ranking process can be implemented separately or in combination.

Figure 4A:
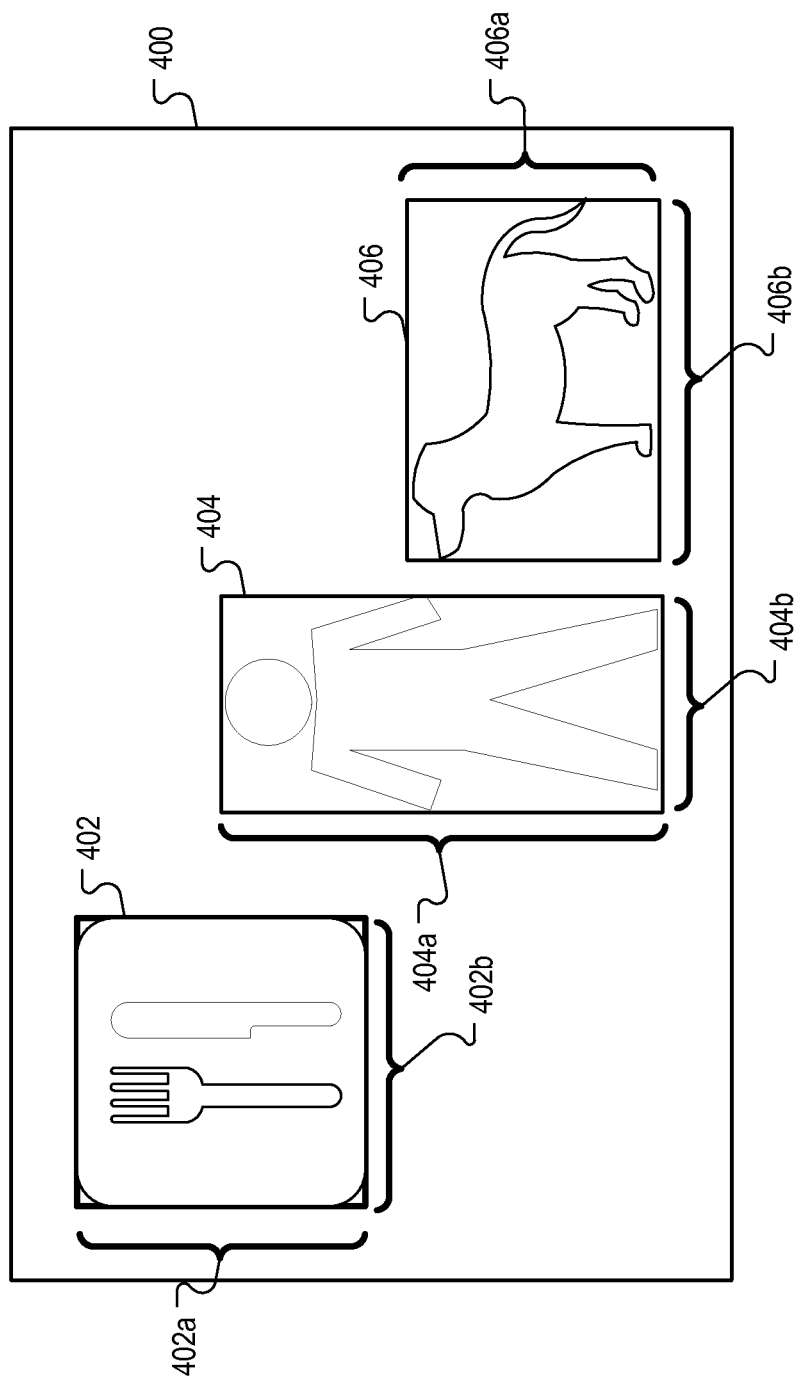
FIG. 4A is a block diagram illustrating an example of determining rank scores for object search results based on an area of bounded regions of the object search results.

FIG. 4A is a block diagram illustrating an example of determining rank scores for object search results based on an area of bounded regions of the object search results. In this example, the image processing apparatus 110 has provided the three bounded regions shown. Each bounded region defines a portion of the image that includes an identified object belonging to the predefined classes. In this example, the provided bounded regions are graphically represented by bounding boxes 402, 404 and 406 each with a height and a width. The bounded region 402 contains an image of a sign and has a height 402a and a width 402b. The bounded region 404 contains an image of a person and has a height 404a and a width 404b. The bounded region 406 contains an image of a dog and has a height 406a and a width 406b. The height and width may be measured using any unit of measurement available, for example pixels, inches, millimeters, etc. In some implementations, the height and width may be measured relative to the height and width of the image, e.g., normalized so that the height and width measures are describe in terms of per-unit measurements of the height and width of the bounded region of the image 400. For example, if the height and width of the image 400 is 500 pixels×700 pixels, and the height 406a and width 406b of the image 406 is 100 pixels×150 pixels, then normalized values are $^{100}/_{700}$ and $^{150}/_{700}$, respectively. For each bounded region the area may be calculated by multiplying the height by the width.

Once an area is determined, a score may be calculated based on the area. In some implementations, the score is the area. In other implementations, the score is proportional to the area, e.g., the area may be an input to an asymptotic function. Other ranking calculations can also be used.

In some implementations, the orientation of the bounding box may further affect the score. For example, objects on their side or at an angle could be less relevant than those standing upright or those which are perpendicular to the image.

Figure 4B:
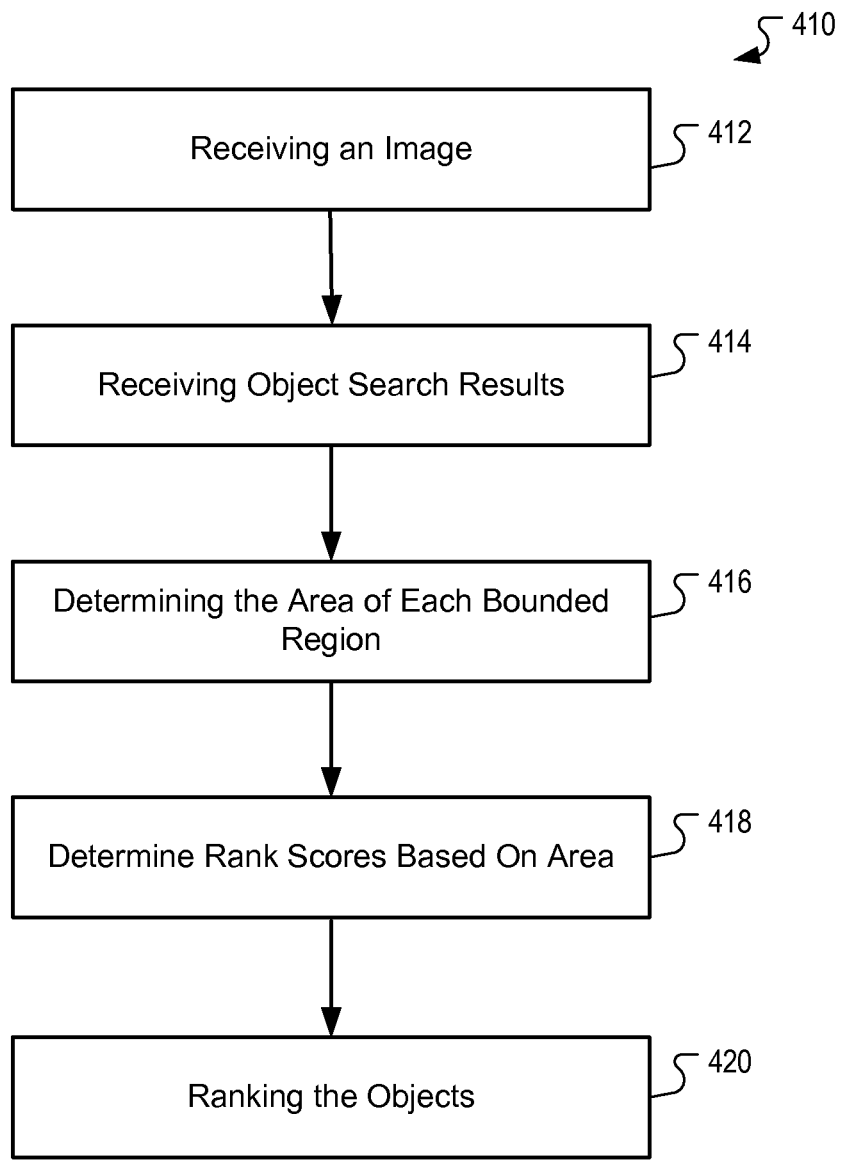
FIG. 4B shows a flow diagram of an example of a process for ranking object search results based on the area of the bounded regions.

FIG. 4B shows a flow diagram of an example of a process 410 for ranking object search results based on the area of the bounded regions. For example, the process 410 describes an implementation of the example described above with respect to FIG. 4A.

The process 410 receives an image (412) and object search results (414) in a manner similar to the process 300 described above.

The process 410 includes determining the area of each bounded region (416). The image ranking apparatus 112 determines the area of each bounded region. In implementations where bounded regions are defined by geometric shapes, the area of each bounded region may be determined using conventional means. For example, the area of a rectangle may be determined by multiplying the height and the width. In implementations where the bounded regions are not defined by geometric shapes, the area of the bounded region may be determined by a count of the number of pixels included in the region.

The process 410 includes determining rank scores based on the areas (418). In some implementations, the score is the area. In other implementations, the score is proportional to the area. In some implementations, the score associated with the area of the bounded region is multiplied by the measure of quality for the bounded region to determine a ranked score.

The process 410 includes ranking the objects (420). The image ranking apparatus 112 ranks the object search results based on their respective ranked scores.

Figure 5A:
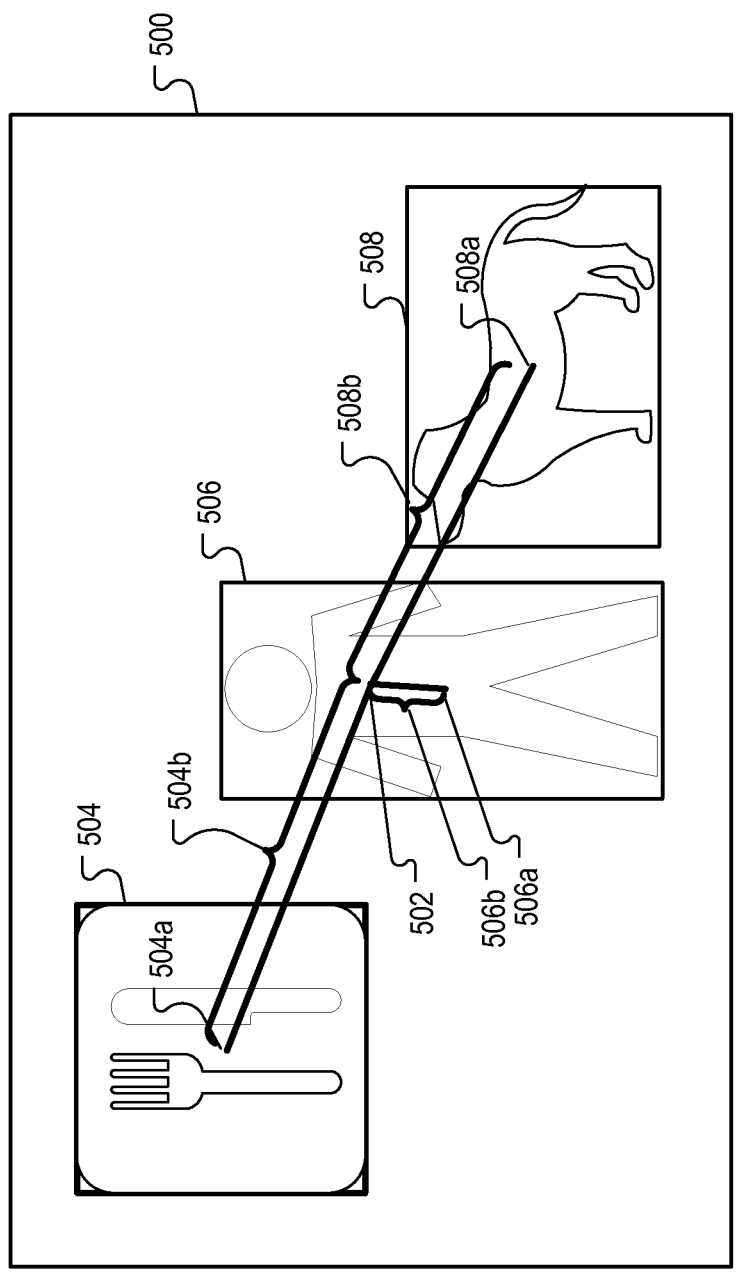
FIG. 5A is a block diagram illustrating an example of determining rank scores for object search results based on locations of the bounded regions of the object search results in the image.

FIG. 5A is a block diagram illustrating an example of determining rank scores for object search results based on locations of the bounded regions of the object search results in the image 500. In this example, a centroid of the image 500 is compared to centroids of the bounded regions 502, 504 and 506, and the rank of each image search result is based, in part, of the comparison. The geometric center of an image 500 is a centroid at a point 502. For the image 500 and each of the bounded regions 502, 504 and 506, respective centroids are determined and are identified by the points 504a, 506a, 508a. The distances 504b, 506b, 508b between the centroid of each bounded region 504a, 506a, 508a, and the centroid of the image 502 is determined using conventional means. For example, the distance d between two points (x1,y1) and (x2, y2) may be calculated using the formula:

$$d = \sqrt{(x2-x1)^2 + (y2-y1)^2}$$

Once the distance between the centroid of the image and the centroid of a bounded region has been determined, a rank score is calculated based on the distance. Generally, the rank score is inversely proportional to the distance between the centroid of the image and the centroid of the bounded region. In some implementations, the score associated with the distance may be defined by the function:

$$\text{score} = 1 - \frac{1}{1 + e^{m-d}}$$

Where d is the distance between the centroid of the bounded region and the centroid of the image, and m is a constant scaling parameter, e.g., 2, 6, 10, etc.

Figure 5B:
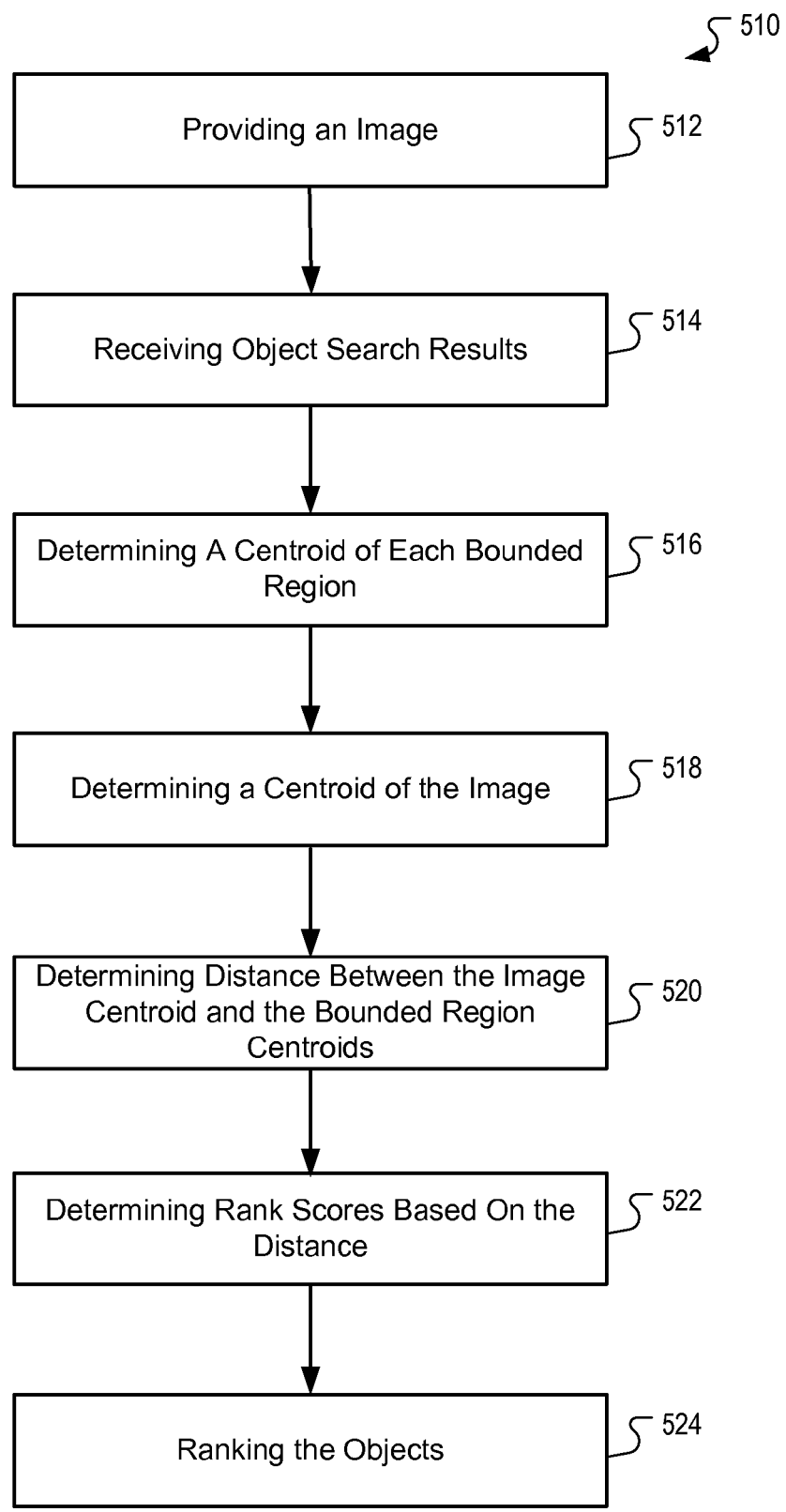
FIG. 5B shows a flow diagram of an example of a process for ranking object search results of an image based on the centroids of the bounded regions.

FIG. 5B shows a flow diagram of an example of a process 510 for ranking object search results of an image based on the centroids of the bounded regions. For example, the process 510 describes an implementation of the example described above with respect to FIG. 5A.

The process 510 includes receiving an image (512) and object search results (514) in a manner similar to the process 300 discussed above. The process 510 determines a centroid of each bounded region (516). For example, the image ranking apparatus 112 may determine the centroid for each bounded region. The centroids of the bounded regions may be determined using conventional means. In the case of a rectangular bounded region, the centroid is located at the point located one half the height and one half the width of the region.

The process determines a centroid of the image (518). For example, the image ranking apparatus 112 may determine the centroid of the image. A centroid, or geometric center, of an image is determined using conventional means.

The process 510 determines the distance between image centroid and the bounded region centroids (520). The image ranking apparatus 112 may determine the distances between the centroid of the image and the centroid of each bounded region as discussed above using conventional means.

The process 510 determines rank scores based on the distances (522). For example, the image ranking apparatus 112 may determine rank scores based on the distances. Generally, the further the centroid of a bounded region is from the centroid of the image the lower the score. In some implementations, the score may be computed using the formula described above. In some implementations, the score associated with the distance is multiplied by the measure of quality for the region to determine a ranked score.

The process 510 ranks the objects (524). The image ranking apparatus 112 may rank the object search results based on their respective scores.

Figure 6A:
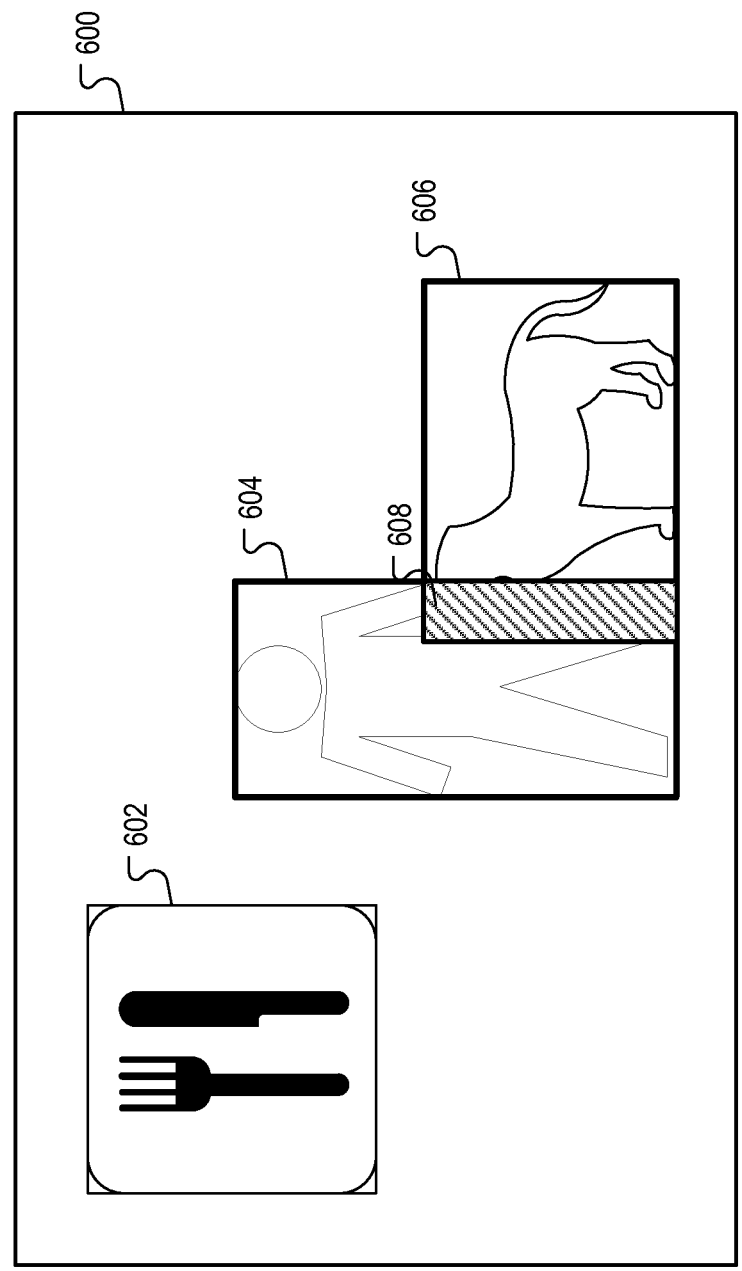
FIG. 6A is a block diagram illustrating an example of determining rank scores for object search results based on an overlap of the bounded regions of the object search results.

FIG. 6A is a block diagram illustrating an example of determining rank scores for object search results based on an overlap of the bounded regions of the object search results. In this example, an image 600 has three bounded regions: one containing a sign 602, one containing a person 604, and one containing a dog 606. The bounded region containing the person 604 overlaps the bounded region containing the dog 606. The area of the overlap is identified by the shaded region 608.

In some implementations, for each bounded region, the area of the bounded region that does not overlap another bounded region is divided by the area of the bounded region. For example, the bounded region 602 does not overlap another bounded region and would therefore have a score of 1. Assuming bounded region 604 has an area of 800 and bounded region 606 has an area of 500 and the overlapping region 608 has an area of 100, the overlap score for bounded region 604 would be 700/800 or 0.875. Similarly, the overlap score for bounded region 606 would be 400/500 or 0.8.

The overlap scores are used to demote each overlapping object. For example, for any two bounded regions R1 and R2, let O(R1, R2) be the ratio of the region R1 that does not overlap the region R2. The demoted score for the object search result corresponding to the region R1 is score(R1) =score(R1)*O(R1, R2). Other demotion scoring can also be used.

Figure 6B:
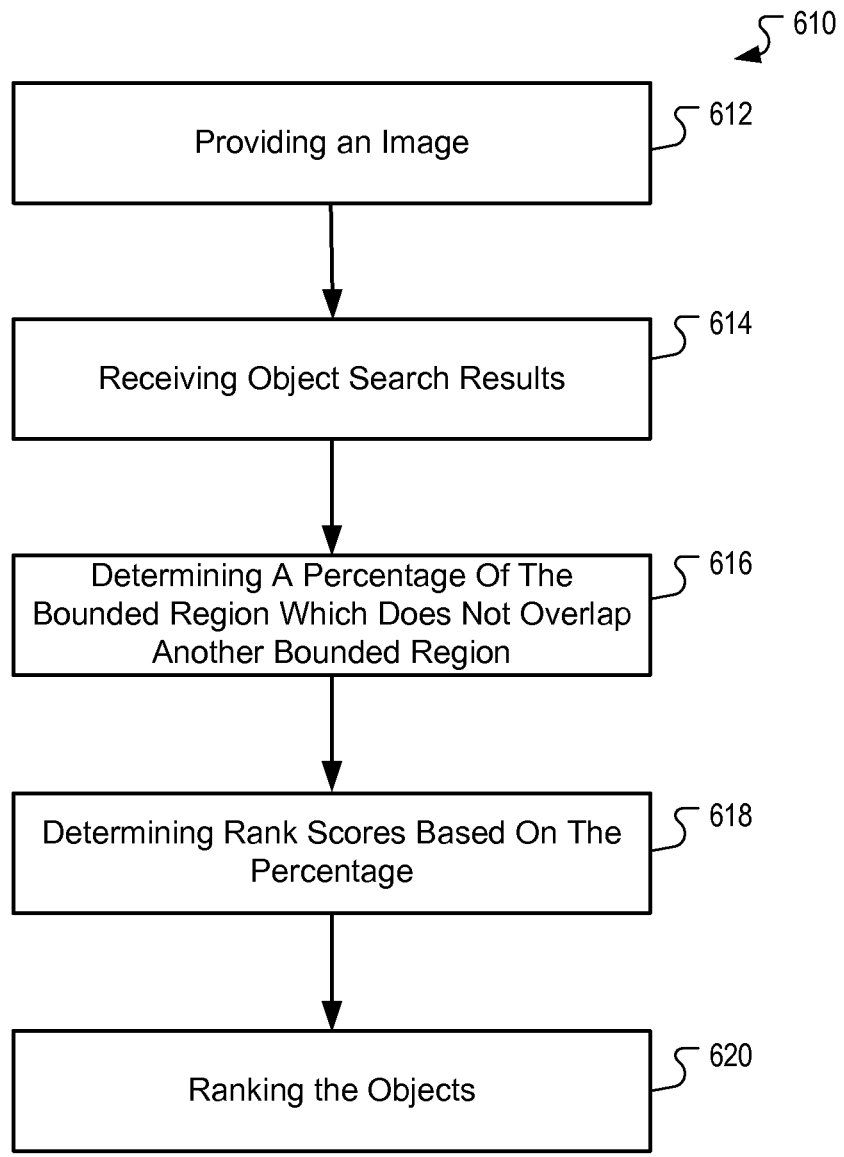
FIG. 6B shows a flow diagram of an example of a process for ranking object search results of an image based on the overlap of the bounded regions.

FIG. 6B shows a flow diagram of an example of a process 610 for ranking object search results of an image based on the overlap of the bounded regions. For example, the process 610 describes an implementation of the example described above with respect to FIG. 6A.

The process includes receiving an image (612) and image search results (614) in a manner similar to the process 300 described above. The process 610, for each bounded region, determines an overlap score based on a portion of the bounded region that does not overlap another bounded region (616). For example, the image ranking apparatus 112 may determine an overlap score based on a portion of the bounded region that does not overlap another bounded region. In some implementations, the overlap score is a ratio of the area of the bounded region which does not overlap another bounded region to the area of the bounded region.

The process 610 determines rank scores based on the overlap score (618). In some implementations, the image ranking apparatus 112 multiplies the score associated with the percentage and the measure of quality for the region to determine a ranked score. Additionally, the scores generated by the process 410 and 510 above can also be multiplied by the overlap score The process 610 includes ranking the objects (620). The image processing apparatus 112 may rank the object search results based on their respective scores.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
   providing, by a computer, an image to an image processing apparatus, the image being defined within a first bounded region;
   receiving, by the computer, from the image processing apparatus a plurality of object search results for the provided image, each object search result identifying:
      a respective pre-specified object class to which a respective object belongs, the respective pre-specified object class being one of a plurality of pre-specified object classes; and
      a respective second bounded region in which the respective object is located, the respective second bounded region being within the first bounded region;
   wherein at least one of the respective pre-specified object classes specified by the object search results is different from each other respective pre-specified object class specified by the object search results;
   determining, by the computer, for each object search result, a respective rank score from characteristics of the respective second bounded region identified by the object search result, comprising:
      determining a first centroid of the first bounded region;
      determining a respective second centroid of the respective second bounded region;
      determining a distance between the first centroid and the respective second centroid; and
      determining the respective rank score based on the respective distance;
   ranking, by the computer, the object search results according to their respective rank scores; and
   providing, for each ranked object search result, a result image to a user device for display according to the ranking, the result image including a portion of the provided image defined by the respective second bounded region identified by the ranked object search result.

2. The method of claim 1, wherein determining, for each object search result, the respective rank score from characteristics of the respective second bounded region identified by the object search result comprises:
   determining a respective area bounded by the respective second bounded region; and
   determining the respective rank score based on the respective area.

3. The method of claim 1, wherein determining the respective rank score based on the respective distance comprises calculating the respective rank score in an inverse proportion to the distance.

4. The method of claim 3, wherein:
   each object search result further includes a respective accuracy score that that measures an accuracy of the object belonging to the respective pre-specified object class; and
   calculating the respective rank score in an inverse proportion to the distance comprises dividing the accuracy score of the object search result by a function of the respective distance.

5. The method of claim 1, wherein determining, for each object search result, the respective rank score from characteristics of the respective second bounded region identified by the object search result comprises:
   identifying, for the respective second bounded region, another respective second bounded region that overlaps the respective second bounded region; and
   determining the respective rank score based on the overlap.

6. The method of claim 5, wherein determining the respective rank score based on the overlap comprises:
   determining a ratio of a first portion of the second bounded region that is not overlapped by the another respective second bounded region to second portion of the second bounded region that is overlapped by the another respective second bounded region; and
   determining the respective rank score based on the ratio.

7. The method of claim 1, wherein determining, for each object search result, the respective rank score from characteristics of the respective second bounded region identified by the object search result comprises:
   determining a respective area bounded by the respective second bounded region;
   determining an area score based on the respective area;
   identifying, for the respective second bounded region, another respective second bounded region that overlaps the respective second bounded region;
   determining an overlap score based on the overlap; and
   determining the respective rank score also based on the area score, and the overlap score.

8. The method of claim 1, wherein each respective second bounded region defines a rectangular region having a height and a width.

9. The method of claim 1, wherein each object search result further includes a portion of the image bounded by the respective second bounded region.

10. The method of claim 1, wherein:
each object search result further includes a respective accuracy score that that measures an accuracy of the object belonging to the respective pre-specified object class; and
determining, for each object search result, the respective rank score from characteristics of the respective second bounded region identified by the object search result comprises determining the respective rank score based on the accuracy score of the object search result and the respective second bounded region identified by the object search result.

11. The method of claim 1, where each respective second bounded region is a proper subset of the first bounded region.

12. The method of claim 1, further comprising:
receiving an indication of a user selection of a particular result image from the result images provided to the user device, and in response:
providing the particular result image to an image search engine;
receiving, from the image search engine, result data specifying information related to the particular result image; and
sending the result data to the user device.

13. The method of claim 12, wherein the result data includes search results, and each search result references a resource that includes information that is related to the pre-specified object class of the at least one of the selected ranked search objects.

14. The method of claim 12, wherein providing the particular result image to the image search engine comprises providing two or more result images to the image search engine in ranked order; and
wherein the result data specifies information that is related to pre-specified object classes of each result image provided to the image search engine.

15. A system comprising:
a data processing apparatus; and
a memory couple to the data processing apparatus having instructions stored thereon which, when executed by the data processing apparatus cause the data processing apparatus to perform operations comprising:
providing an image to an image processing apparatus, the image being defined within a first bounded region;
receiving from the image processing apparatus a plurality of object search results for the provided image, each object search result identifying:
a respective pre-specified object class to which a respective object belongs, the respective pre-specified object class being one of a plurality of pre-specified object classes; and
a respective second bounded region in which the respective object is located, the respective second bounded region being within the first bounded region;
wherein at least one of the respective pre-specified object classes specified by the object search results is different from each other respective pre-specified object class specified by the object search results;
determining, by the computer, for each object search result, a respective rank score from characteristics of the respective second bounded region identified by the object search result, comprising:
determining a first centroid of the first bounded region;
determining a respective second centroid of the respective second bounded region;
determining a distance between the first centroid and the respective second centroid; and
determining the respective rank score based on the respective distance;
ranking, by the computer, the object search results according to their respective rank scores; and
providing, for each ranked object search result, a result image to a user device for display according to the ranking, the result image including a portion of the provided image defined by the respective second bounded region identified by the ranked object search result.

16. The system of claim 15, wherein determining, for each object search result, the respective rank score from characteristics of the respective second bounded region identified by the object search result comprises:
determining a respective area bounded by the respective second bounded region; and
determining the respective rank score based on the respective area.

17. The system of claim 15, wherein determining the respective rank score based on the respective distance comprises calculating the respective rank score in an inverse proportion to the distance.

18. The system of claim 17, wherein:
each object search result further includes a respective accuracy score that that measures an accuracy of the object belonging to the respective pre-specified object class; and
calculating the respective rank score in an inverse proportion to the distance comprises dividing the accuracy score of the object search result by a function of the respective distance.

19. The system of claim 15, wherein determining, for each object search result, the respective rank score from characteristics of the respective second bounded region identified by the object search result comprises:
identifying, for the respective second bounded region, another respective second bounded region that overlaps the respective second bounded region; and
determining the respective rank score based on the overlap.

20. The system of claim 19, wherein determining the respective rank score based on the overlap comprises:
determining a ratio of a first portion of the second bounded region that is not overlapped by the another respective second bounded region to second portion of the second bounded region that is overlapped by the another respective second bounded region; and
determining the respective rank score based on the ratio.

21. The system of claim 15, wherein determining, for each object search result, the respective rank score from characteristics of the respective second bounded region identified by the object search result comprises:
determining a respective area bounded by the respective second bounded region;
determining an area score based on the respective area;
identifying, for the respective second bounded region, another respective second bounded region that overlaps the respective second bounded region;
determining an overlap score based on the overlap; and determining the respective rank score also based on the area score and the overlap score.

22. The system of claim 15, wherein each respective second bounded region defines a rectangular region having a height and a width.

23. The system of claim 15, wherein each object search result further includes a portion of the image bounded by the respective second bounded region.

24. The system of claim 15, wherein:
each object search result further includes a respective accuracy score that that measures an accuracy of the object belonging to the respective pre-specified object class; and
determining, for each object search result, the respective rank score from characteristics of the respective second bounded region identified by the object search result comprises determining the respective rank score based on the accuracy score of the object search result and the respective second bounded region identified by the object search result.

25. The system of claim 15, where each respective second bounded region is a proper subset of the first bounded region.

26. The system of claim 15, wherein the memory further comprises instructions that when executed by the data processing apparatus cause the data processing apparatus to perform operations comprising:
receiving an indication of a user selection of a particular result image from the result images provided to the user device, and in response:
providing the particular result image to an image search engine;
receiving, from the image search engine, result data specifying information related to the particular result image; and
sending the result data to the user device.

27. A computer program product encoded on a non-transitory computer readable medium, operable to cause a data processing apparatus to perform operations comprising:
providing an image to an image processing apparatus, the image being defined within a first bounded region;
receiving from the image processing apparatus a plurality of object search results for the provided image, each object search result identifying:
a respective pre-specified object class to which a respective object belongs, the respective pre-specified object class being one of a plurality of pre-specified object classes; and
a respective second bounded region in which the respective object is located, the respective second bounded region being within the first bounded region;
wherein at least one of the respective pre-specified object classes specified by the object search results is different from each other respective pre-specified object class specified by the object search results;
determining, by the computer, for each object search result, a respective rank score from characteristics of the respective second bounded region identified by the object search result, comprising:
determining a first centroid of the first bounded region;
determining a respective second centroid of the respective second bounded region;
determining a distance between the first centroid and the respective second centroid; and
determining the respective rank score based on the respective distance;
ranking, by the computer, the object search results according to their respective rank scores; and
providing, for each ranked object search result, a result image to a user device for display according to the ranking, the result image including a portion of the provided image defined by the respective second bounded region identified by the ranked object search result.

* * * * *